United States Patent
Kusari

(10) Patent No.: US 10,831,208 B2
(45) Date of Patent: Nov. 10, 2020

(54) VEHICLE NEURAL NETWORK PROCESSING

(71) Applicant: Ford Global Technologies, LLC, Dearborn, MI (US)

(72) Inventor: Arpan Kusari, East Lansing, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 163 days.

(21) Appl. No.: 16/177,787

(22) Filed: Nov. 1, 2018

(65) Prior Publication Data

US 2020/0142420 A1   May 7, 2020

(51) Int. Cl.
G05D 1/02 (2020.01)
B60W 30/18 (2012.01)
G06N 3/04 (2006.01)

(52) U.S. Cl.
CPC ..... *G05D 1/0221* (2013.01); *B60W 30/18163* (2013.01); *G05D 1/0223* (2013.01); *G06N 3/0454* (2013.01)

(58) Field of Classification Search
CPC ....... G05D 1/0221; G05D 1/0223; G06N 3/02
See application file for complete search history.

(56) References Cited

U.S. PATENT DOCUMENTS

| | | | |
|---|---|---|---|
| 9,754,221 B1 | 9/2017 | Nagaraja | |
| 9,939,791 B2 | 4/2018 | Koga | |
| 10,595,037 B2 * | 3/2020 | Choi | G06T 7/20 |
| 2017/0364831 A1 | 12/2017 | Ghosh et al. | |
| 2018/0088571 A1 | 3/2018 | Weinstein-Raun | |
| 2018/0124423 A1 * | 5/2018 | Choi | G06N 3/0445 |
| 2018/0234348 A1 * | 8/2018 | Goloubew | G06N 3/0445 |
| 2019/0220016 A1 * | 7/2019 | Phillips | B60W 30/0953 |
| 2019/0235515 A1 * | 8/2019 | Shirvani | G06K 9/6271 |

FOREIGN PATENT DOCUMENTS

| | | |
|---|---|---|
| CN | 106842925 A | 6/2017 |
| JP | 5815458 B2 | 11/2015 |

OTHER PUBLICATIONS

Wang et al., "Robust Imitation of Diverse Behaviors", arXiv:170.02747v2, Jul. 14, 2017.

* cited by examiner

*Primary Examiner* — Thomas G Black
*Assistant Examiner* — Tarek Elarabi
(74) *Attorney, Agent, or Firm* — Frank A. MacKenzie; Bejin Bieneman PLC

(57) ABSTRACT

A computing system can be programmed to determine a vehicle action based on vehicle sensor data input to a deep neural network (DNN) trained using an inverse reinforcement learning (IRL) system that includes a variational auto-encoder (VAE). The computing system can be further programmed to operate a vehicle based on the vehicle action.

19 Claims, 4 Drawing Sheets

VEHICLE NEURAL NETWORK PROCESSING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
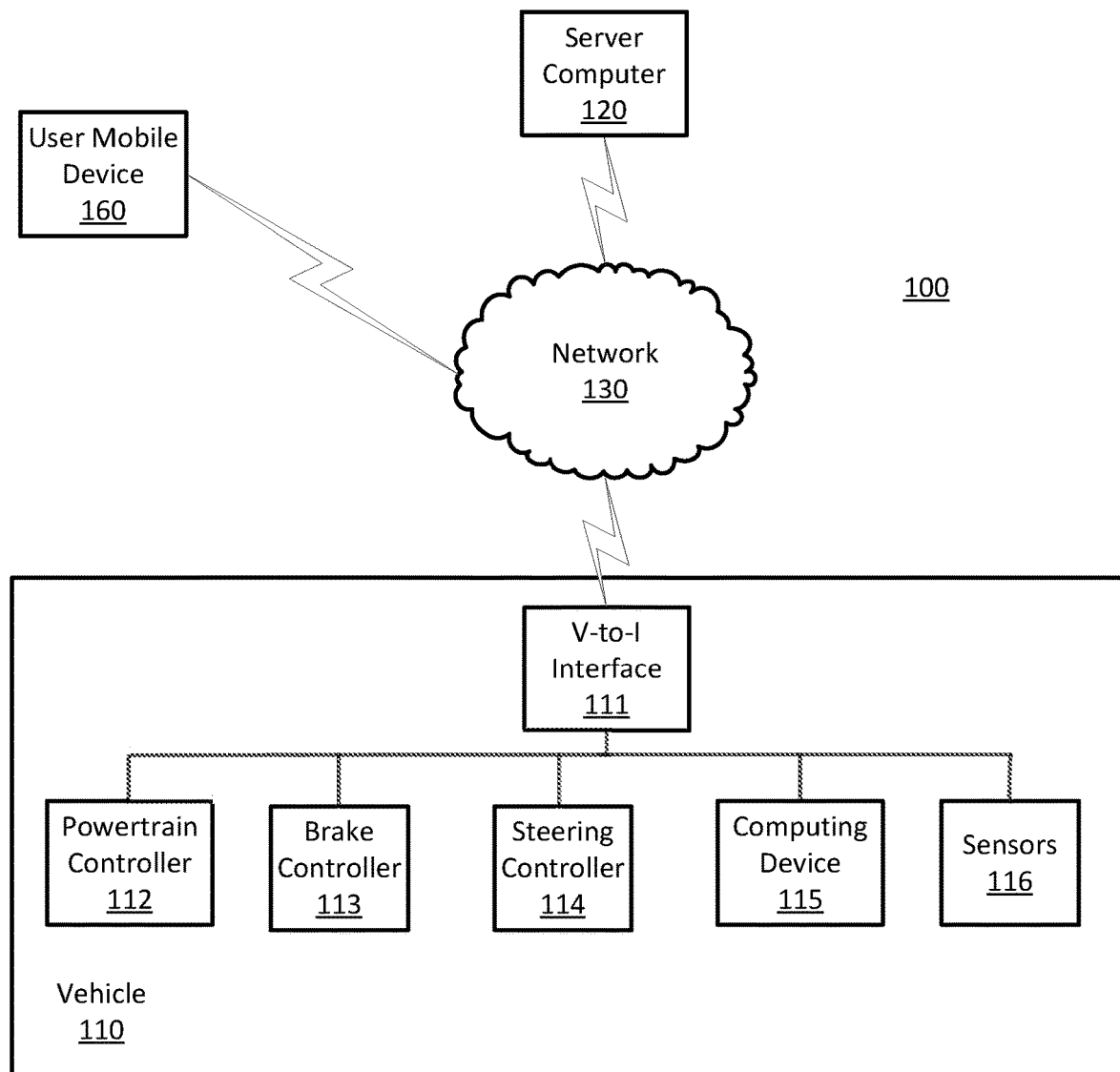
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle trajectory to be used to operate a vehicle in autonomous or semi-autonomous mode. For example, the computing device can provide information to controllers (e.g., electronic control units or ECUs) to operate vehicle on a roadway in traffic including locations of objects including other vehicles and pedestrians. Based on sensor data, a computing device can determine a path polynomial for a vehicle to travel to reach a destination on a roadway in the presence of other vehicles and pedestrians, wherein a path polynomial is a polynomial function that describes a straight or curved line connecting successive locations of a vehicle as it moves from a first location on a roadway to a second location on a roadway. A computing device can determine vehicle trajectories based on a path polynomial that can be used to operate a vehicle on a roadway. Discussed herein is a technique for determining the behavior of a vehicle (the reward function) based on vehicle sensor data input to a variational auto-encoder (VAE). The reward function is then used to get the reconstructed policy using a policy network defined as a deep neural network.

Disclosed herein is a method, including determining a vehicle action based on vehicle sensor data input to a deep neural network (DNN) trained using an inverse reinforcement learning (IRL) system that includes a variational auto-encoder (VAE) and operating a vehicle based on the vehicle action. The DNN can be trained using the VAE to generate a reconstructed policy. The reconstructed policy can be based on a vehicle state and a latent reward function. An adversarial discriminator network can discriminate the reconstructed policy and an expert policy. The expert policy can be based on the vehicle having N trajectories. The reconstructed policy can be used to recover the expert policy and the latent reward function. The vehicle sensor data can include distances and relative speeds from neighboring vehicles in left, right and same lanes.

The vehicle action can include three modes of vehicle speed change including more speed, less speed, and no change. The vehicle action can include three modes of vehicle lateral position change including left lane change maneuver, same lane, and right lane change maneuver. The VAE can include a policy processing block that determines a reconstructed action based on a reward and an expert state. The VAE can include a discriminator processing block that determines a processed reward based on the reconstructed action and an expert action based on a similarity of the reconstructed action and the expert action. The DNN updates latent computational information based on the processed reward. A path polynomial can be determined based on the vehicle action. Operating the vehicle can include instructing vehicle powertrain, braking and steering components based on the path polynomial.

Further disclosed is a computer readable medium, storing program instructions for executing some or all of the above method steps. Further disclosed is a computer programmed for executing some or all of the above method steps, including a computer apparatus, programmed to determine a vehicle action based on vehicle sensor data input to a deep neural network (DNN) trained using an inverse reinforcement learning (IRL) system that includes a variational auto-encoder (VAE) and operate a vehicle based on the vehicle action. The DNN can be trained using the VAE to generate a reconstructed policy. The reconstructed policy can be based on a vehicle state and a latent reward function. An adversarial discriminator network can discriminate the reconstructed policy and an expert policy. The expert policy can be based on the vehicle having N trajectories. The reconstructed policy can be used to recover the expert policy and the latent reward function. The vehicle sensor data can include distances and relative speeds from neighboring vehicles in left, right and same lanes.

The computer apparatus can be further programmed to include three modes of vehicle speed change in vehicle action including more speed, less speed, and no change. The vehicle action can include three modes of vehicle lateral position change including left lane change maneuver, same lane, and right lane change maneuver. The VAE can include a policy processing block that determines a reconstructed action based on a reward and an expert state. The VAE can include a discriminator processing block that determines a processed reward based on the reconstructed action and an expert action based on a similarity of the reconstructed action and the expert action. The DNN updates latent computational information based on the processed reward. A path polynomial can be determined based on the vehicle action. Operating the vehicle can include instructing vehicle powertrain, braking and steering components based on the path polynomial.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
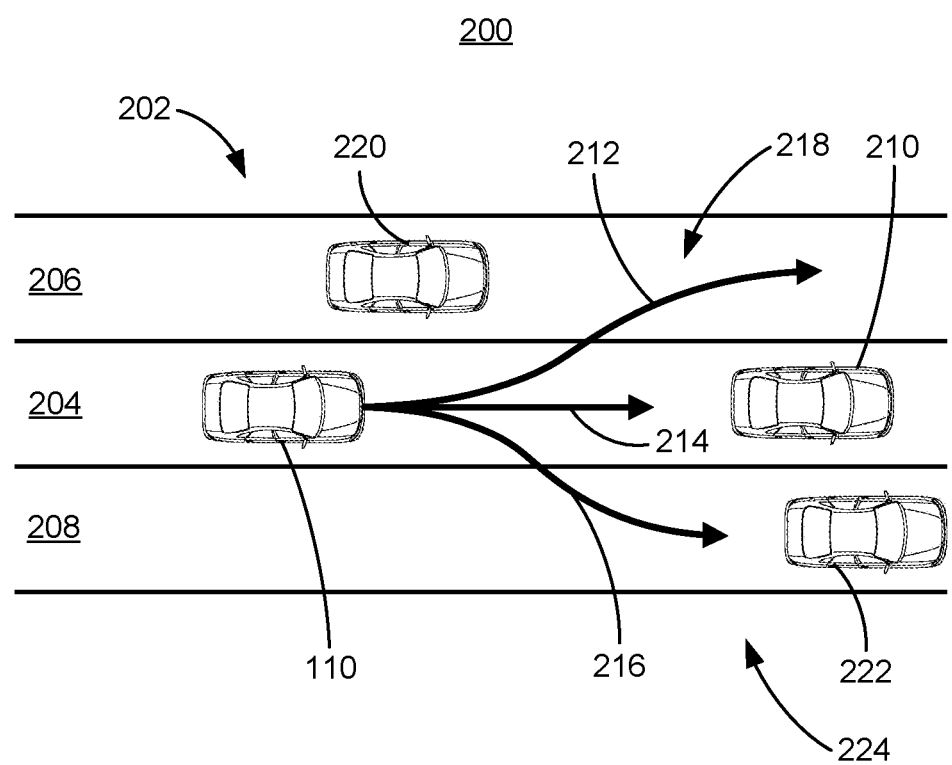
FIG. 2 is a diagram of an example traffic scene.

FIG. 2 is a diagram of an example traffic scene 200 including a vehicle 110 operating on a roadway 202 in a lane 204. Vehicle 110 operation on a roadway 202 can be represented by path polynomials 212, 214, 216, referred to herein collectively and individually by the reference numeral 218. A path polynomial 218 is a polynomial function of degree three or less calculated on a vehicle vector that can include 3D (dimensional) vehicle trajectory data wherein a vehicle trajectory is a vector that includes vehicle 3D pose and vehicle 3D acceleration, wherein 3D pose includes x, y, and z spatial coordinates and roll, pitch and yaw rotational coordinates with respect to a coordinate system such as latitude, longitude and altitude, and 3D acceleration includes accelerations in x, y, z, linear directions and roll, pitch and yaw rotational directions. For computational purposes, 3D vehicle trajectory data can be expressed as a 2D (dimensional) location in a plane parallel to a roadway, a 2D direction in the plane, a speed in the 2D direction and lateral and longitudinal accelerations with respect to the 2D direction, all with respect to the motion of a vehicle 110. Computing device 115 in vehicle 110 can determine a path polynomial 218 by estimating future trajectory data for vehicle 110.

The future trajectory data can be estimated based on a determined destination location or goal location in traffic scene 200 and then based on determining a succession of locations that reach the destination location or goal at a target speed while limiting lateral (yaw) and longitudinal (x) accelerations due to steering, braking and powertrain. Upper and lower limits on lateral and longitudinal accelerations can be based on user input limits. Computing device 115 can then use the path polynomial to determine instructions for controllers 112, 113, 114 to cause vehicle powertrain, steering, and braking to operate based on a mathematical model of vehicle 110. A mathematical model of vehicle 110 is a computer program executing on a computing device 115 that can predict vehicle 110 real world behavior in response to powertrain, steering, and braking instructions. A mathematical model of vehicle 110 can be determined empirically by recording a plurality of controller instructions and vehicle 110 trajectories corresponding to the controller instructions and determining mathematical relationships between vehicle 110 trajectories and controller instructions. Computing device 115 can use an empirically determined mathematical model of vehicle 110 to determine controller instructions that will cause vehicle 110 to move in space according to trajectories that will result in vehicle 110 operating along the path polynomial 218.

Included in example traffic scene 200 are other vehicles 210, 220, 222, referred to herein collectively and individually by reference numeral 224, operating on roadway 202. Vehicle 110 can be traveling on roadway 202 according to vehicle commands, which are instructions describing the operation of a vehicle 110 that can be used by computing device 115 to determine a path polynomial 218 upon which to operate a vehicle 110. A computing device 115 can execute a vehicle command directing a vehicle 110 to maintain a target speed in a lane 204, 206, 208 on a roadway 202, for example. In the example in traffic scene 200, a first or host vehicle 110 can be traveling at a greater speed than a second vehicle 210 in the same lane 204. If vehicle 110 does not change its speed and/or direction, a collision or near-collision with other vehicle 210 can occur. In the example in traffic scene 200, vehicle 110 can either slow down to match the speed of other vehicle 210, illustrated by path polynomial 214 or perform a left or right lane change or passing maneuver, illustrated by path polynomials 212, 216.

Computing device 115 can use a deep neural network (DNN) to determine how to respond to a traffic situation illustrated by traffic scene 200, for example. Based on based on vehicle sensor 116 data input, a DNN can output vehicle commands that computing device 115 can use to change vehicle speed and location according to a travel plan. Vehicle sensor 116 data can include video sensor data, lidar sensor data and radar sensor data, for example. Vehicle sensor 116 data can include vehicle sensor 116 data processed by computing device 115 to determine objects including other vehicles and pedestrians, for example. Computing device can process vehicle sensor 116 data to determine distances, directions and relative speeds with respect to objects in an environment around, i.e., within a range of sensors 116, a vehicle 110 while the vehicle 110 is traveling on a roadway 202.

Computing device 115 can determine how to respond to a traffic situation by inputting a vehicle state based on vehicle sensor 116 data into a DNN, wherein the DNN is programmed to output a vehicle action responsive to the vehicle state. The vehicle sensor data can include the distances and relative speeds of other vehicles 224 in lanes 204, 206, 208 of a roadway 202, for example. The DNN can input a vehicle state and output a vehicle action that can be used by computing device 115 to operate vehicle 110. Using techniques discussed herein, operation of vehicle 110 is improved by computing device 115 determining a response to a traffic scene 200 based on vehicle sensor data using a deep neural network (DNN) trained with an inverse reinforcement learning (IRL) system that includes a variational auto-encoder (VAE).

A DNN trained to output a vehicle action based on an input vehicle state is an expert system running a Markov Decision Process (MDP), wherein a vehicle state transition probability $p(s_{t+1}|s_t, a_t)$ characterizes a next vehicle state $s_{t+1}$ based on a current state $s_t$ and a current vehicle action $a_t$. Upon receipt of a current vehicle state $s_t$ DNN outputs a vehicle action $a_t$. Training a DNN is based on a scalar reward $r_t$, and a new vehicle state $s_{t+1}$ determined based on empirical or simulated data from the environment. To determine a scalar reward, a cumulative discounted sum of rewards or value function $v^t$ can be maximized:

$$v^t = \Sigma_{k=0}^{\infty} \gamma^k r_{t+k} \tag{1}$$

where $0 \leq \gamma \leq 1$ is a discount factor and $r_t$ is a reward at a time t.

The DNN output can be underdetermined due to unknown, incomplete, missing, or erroneous data. A cumulative reward function $v^t$ for a vehicle 110 can be intractable by being based on unknown or incompletely known data. For example, a cumulative reward function $v^t$ can be based on predicted future actions of other vehicles 224, or other events unknown at the time the cumulative reward is calculated. Because of such unknowns, the equations being used to calculate a reward function can be underdetermined. Underdetermined equations have more unknown results than known inputs and can therefore be solved correctly with more than one solution and in some examples an infinite number of solutions. Special techniques can be used to calculate underdetermined functions. For example, Markov Chain Monte Carlo (MCMC) techniques can randomly sample the solution space and permit optimization of reward function calculations to overcome underdetermined equations. MCMC techniques can require a priori information regarding the Markov process to select parameters for a linear programming model that permits the MCMC process to converge.

Techniques described herein can improve DNN training to permit DNN to solve underdetermined equations without requiring a priori information by determining a reward function using a neural network approximate inference model known as a variational auto-encoder (VAE). A VAE includes a policy optimization network to generate a reconstructed policy from a vehicle state by combining a latent reward function based on a prior experience expert policy, and an adversarial discriminator network to discriminate the reconstructed policy and expert policy. Variational auto-encoders solve the problem of underdetermined equations by generating a plurality of reconstructed policies distributed over the solution space of reconstructed policies and determining which reconstructed policies of the plurality of reconstructed policies match expert policies. Techniques described herein use an adversarial process including a discriminator network to determine if a policy generated by an encoder neural network is an expert policy. Using an adversarial process, a neural network can be trained to generate reconstructed policies that are generally indistinguishable from expert policies.

Figure 3:
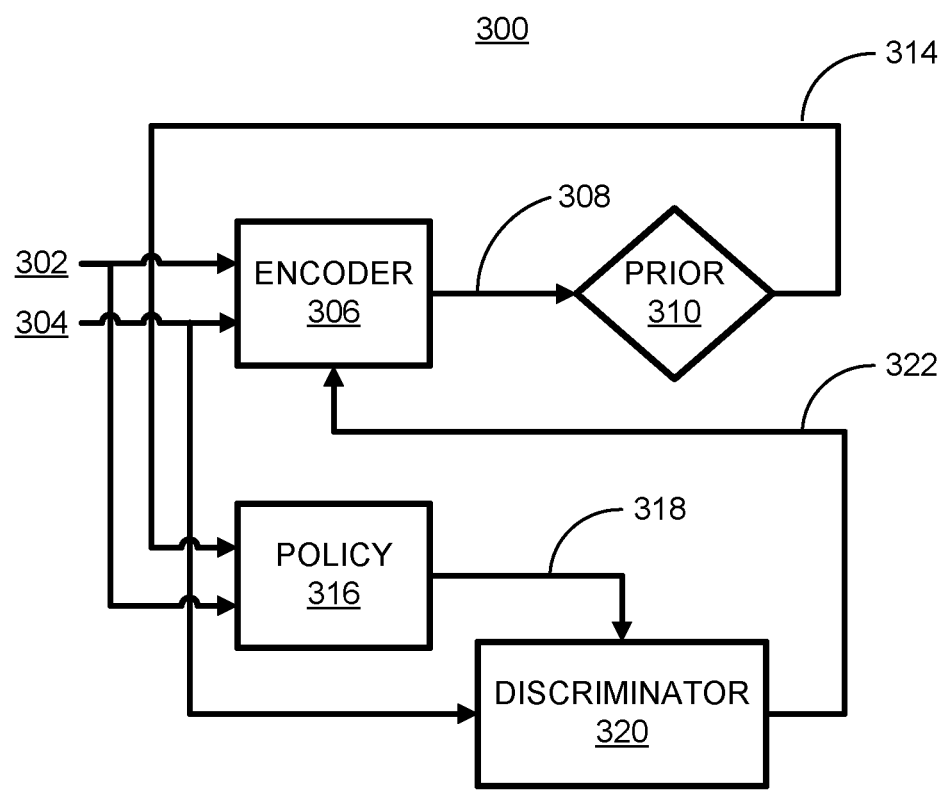
FIG. 3 is a diagram of an example inverse reinforcement learning (IRL) system.

FIG. 3. is a diagram of an example inverse reinforcement learning (IRL) system 300. IRL system 300 is an expert system configured to perform non-linear Bayesian inverse reinforcement learning. An expert system is a machine intelligence system that can input state information regarding an environment around a vehicle, for example, and based on a latent internal state, output a vehicle action. IRL system 300 includes a neural network encoder processing block 306. Neural network encoder processing block 306 is a probabilistic encoder. The true reward function being intractable, the approximate reward function can be assumed to have a multivariate Gaussian with a diagonal covariance structure as:

$$\log(q_\phi(z|x_i)) = \log(\mathcal{N}(z; \mu_i, \sigma_i^2 I)) \tag{2}$$

where $q_\phi(z|x_i)$ is an approximation of $p(z, x)$, the joint probability density corresponding to observations $x = x_{1:n}$ and latent variables $z = z_{1:m}$. $p(z) = \mathcal{N}(z; \mu_i \sigma_i^2 I)$ is a multivariate Gaussian probability density distribution for latent variable z with mean and variance $\sigma^2$, defined over a set of intractable reward functions I.

Encoder processing block 306 can input an expert state 302 including information on distances, directions and relative speeds to other vehicles 224 and input an expert action 304 including a vehicle trajectory and use the input expert state 302 and expert action 304 to train encoder processing block 306 by rewarding encoder processing block 306 for calculating expert action 304 based on expert state 302. Expert state 302 can be determined based on vehicle sensor data regarding an environment around a vehicle including distances, directions and relative speeds to other vehicles 224. Expert action 304 can be a vehicle command determined based on empirical data regarding real world vehicle commands executed by a computing device 115 in response to an expert action 304 recorded by computing device 115. Computing device 115 can also determine information regarding cumulative reward functions $v^t$ corresponding to expert states 302 and expert actions 304 as defined in equation (1). The information regarding cumulative reward functions $v^t$ can be stored at prior processing block 310 as probability density distributions.

Vehicle states and vehicle actions can be recorded for a plurality of vehicles 110 in a plurality of traffic scenes 200 along with information regarding probability distributions of cumulative rewards corresponding to the vehicle states and vehicle actions. Information regarding probability distributions for rewards corresponding to outcomes from the vehicle actions can be acquired and processed to form expert probability distributions of cumulative rewards corresponding to an expert state 302 and an expert action 304. A number of expert states 302 and expert actions 302 can be limited by limiting the number of vehicle trajectories to a number N, where N can be greater than 100. N can be determined by selecting sample rates and resolutions for location, direction and speed information in a vehicle trajectory vector that limit N to a computationally tractable number, for example. By limiting the number of vehicle trajectories to N, expert states 302 and expert actions 304 can be enumerated with respect to vehicle trajectories and probability distributions of cumulative rewards can be calculated for the enumerated expert states 302 and expert actions 304.

Probability distributions of cumulative rewards can be calculated based on acquiring expert states 302 and expert actions 304 using simulation data. Traffic scenes 200 and vehicle 110 operation can be simulated using computing techniques based on video game technology. Technology used to determine realistic displays of vehicles in video games can be used to determine expert states 302 including distances to other vehicles 224. Video game technology can be used to determine an expert action 304 based on an expert state 302 and provide information to permit computing device 115 to determine a cumulative reward function $v^t$. Probability distributions of cumulative reward functions $v^t$ can be determined by executing a plurality of simulations under a plurality of conditions of expert state 302, for example.

Encoder processing block 306 can calculate an expert action 304 based on an input expert state 302 and outputs 308 both expert action 304 and expert state 302 to prior processing block 310. Prior processing block determines a reward 314 based on probability distributions of cumulative reward functions v' previously acquired from real world data and simulated data as described above. Prior processing block can determine a reward 314 based on expert action 304 and expert state 302 based on probability distributions of cumulative reward functions v' and outputs a reward 314 to policy processing block 316.

Policy processing block 316 is a neural network that determines a reconstructed action 318 based on the reward 314 and input expert state 302 according to equation (4) below. The reconstructed action 318 is output to discriminator processing block 320 to determine if the reconstructed action 318 is indistinguishable from an expert action 304.

Discriminator processing block 320 is a neural network that determines whether a reconstructed action 318 is equal to input expert action 304. Discriminator block 320 can determine whether a reconstructed action 318 is equal to input expert action 304 by executing a discriminator function. A discriminator function is a function that determines similarity between a reconstructed action 318 and an expert action 304 according to equation (3), below. If the reconstructed action 318 is determined to be similar to an expert action 304, wherein similarity is defined by user input, the discriminator function output a "true" or "real" result. If the reconstructed action 318 is determined to be not similar, as defined by user input, to an expert action 304, the discriminator function outputs a "false" or "fake" result. Discriminator processing block 320 can apply a discriminator loss function to reward 314 and output the processed reward 322 to encoder processing block 306, to update encoder processing block 306 with the processed reward 322.

Discriminator processing block 320 distinguishes an expert action from a reconstructed action by calculating discriminator loss according to the equation:

$$L_{discriminator} = \frac{1}{m}\sum_{i=1}^{m}[\log(D(\pi_E)) + \log(1 - D(\pi_R))] \quad (3)$$

wherein D is a discriminator function that scores reconstructed action $\pi_R$ and expert action $\pi_E$ based on how similar reconstructed action $\pi_R$ is to an expert action. Policy processing block 316 loss is constructed at a summation of weighted log likelihood loss from the encoder processing block 306 and prior processing block 310 according to a loss function:

$$L_{policy} = \frac{1}{m}\sum_{i=1}^{m}[\log(\pi_R(a_m|s_m))*r(s_m, a_m) + \log(1 - D(\pi_R))] \quad (4)$$

wherein $\pi_R$ is a reconstructed action and $r(s_m, a_m)$ is a reward function for a number of different samples m of expert states 302 $s_m$ and expert actions 304 $a_m$. Likelihood loss is given by summation of a cross-entropy error function and discriminator loss from equation (3), above:

$$L_{likelihood} + L_{discriminator} = \quad (5)$$
$$\frac{1}{m}\sum_{i=1}^{m}[s_m*\log(\pi_R(s_m)) + (1 - s_m)*\log(\pi_R(s_m))]$$

and the divergence loss is given by the Kullback-Lieber (KL) divergence between posterior and prior reward functions as given in equation (2), above $$L_{divergence} = KL(q_\phi(z|x_i)\|p(z)) \quad (6)$$

Kullback-Lieber divergence is a measure in information loss corresponding to a difference between the probability distributions of the posterior and the prior reward functions.

IRL system 300 can process a plurality of expert state 302 and expert action 304 pairs, processing each pair a plurality to times to generate programming information stored at encoder processing block 306. Following training IRL system 300 with a plurality of expert state 302 and expert action 304 pairs programming information included in encoder processing block 306 can be uploaded to computing device 115 and stored in non-volatile memory. The programming information can be downloaded by computing device 115 to a DNN configured similarly to encoder processing block 306. The programmed DNN can determine vehicle actions based on input vehicle state information. The vehicle action output from the DNN will be similar to the expert action output by IRL system 300 in spite of having incomplete or missing cumulative reward information.

IRL system 300 can improve the operation of vehicle 110 by determining a vehicle action based on a vehicle state wherein the vehicle state and the vehicle action does not include enough information to determine a cumulative reward function. Using an IRL system 300 including a VAE, wherein a VAE includes a policy processing block 316 and a discriminator 320, computing device 115 can train an encoder processing block 306 and transfer the programming information to a DNN configured similarly to encoder processing block to determine vehicle actions based on input vehicle states.

Figure 4:
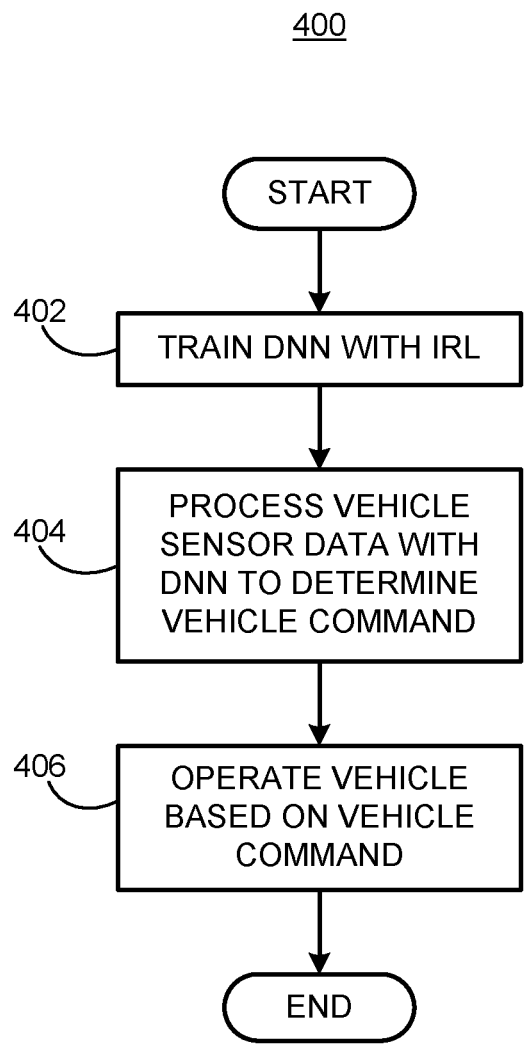
FIG. 4 is a flowchart diagram of an example process to operate a vehicle based on a vehicle trajectory.

FIG. 4 is a diagram of a flowchart, described in relation to FIGS. 1-3, of a process 400 for operating a vehicle based on vehicle actions determined by a DNN trained with an IRL. Process 400 can be implemented by a processor of computing device 115, taking as input information from sensors 116, and executing commands and sending control signals via controllers 112, 113, 114, for example. Process 400 includes multiple blocks taken in the disclosed order. Process 400 also includes implementations including fewer blocks or can include the blocks taken in different orders.

Process 400 begins at block 402, wherein a DNN is trained using an IRL system 300 as discussed above in relation to FIG. 3. IRL system 300 inputs an expert state 302, including information regarding objects in a vehicle 110 environment including distances, directions, and relative speeds of other vehicles 224. Information regarding objects in a vehicle environment includes information determined based on vehicle sensor 116 data. IRL system 300 inputs an expert action 304, including a vehicle action. The vehicle action can include a vehicle trajectory, wherein a vehicle trajectory includes directions to operate a vehicle 110 on a roadway 202. Based on a plurality of input expert states 302 and expert actions 304 and expert probability distributions determined based on empirical evidence, IRL system 300 can train a DNN to output a vehicle trajectory and a reward in response to an input vehicle state.

At block 404 computing device 115 acquires vehicle sensor 116 data including video sensor data, lidar sensor data and radar sensor data to determine distances, directions, and relative speeds of other vehicles 224 in a vehicle 110 environment. The distances, directions and relative speeds of other vehicles 224 are processed by the trained DNN to determine a vehicle action and a reward, wherein the reward is a number in the range [0 . . . 1]. In this example the reward can be positive (+0.1) for going faster and zero reward for going slower. A large negative reward (−2) can be awarded for collisions or going off-road. A vehicle action space can include vehicle trajectories including three modes of vehicle velocity change (More speed/Less speed/No change) and three modes of lateral position change (Move left lane/Same lane/Move right lane).

At block 406, computing device 115 operates vehicle 110 based on the vehicle action output at block 404 as discussed above in relation to FIG. 2. Computing device 115 can operate vehicle 110 by determining a path polynomial 218 based on the vehicle command. The path polynomial will include vehicle trajectories that include velocities from one of the three vehicle velocity change modes and locations and directions from one of the three lateral position change modes. Computing device 115 can determine instructions to direct vehicle powertrain, braking and steering via controllers 112, 113, 114 to operate vehicle 110 along the path polynomial 218 and thereby accomplish the vehicle action output at block 404. Following block 406 process 400 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method, comprising:
    training a deep neural network (DNN) using an inverse reinforcement learning (IRL) system that includes a variational auto-encoder (VAE) by generating a reconstructed policy at least in part by applying a cumulative reward function, and then using an adversarial discriminator network to discriminate the reconstructed policy and an expert policy at least in part by distinguishing expert actions from reconstructed actions by calculating discriminator loss and thereby determine the cumulative reward function based on incomplete or missing cumulative reward information;
    determining a vehicle action based on vehicle sensor data input to the DNN; and
    operating the vehicle based on the vehicle action.

2. The method of claim 1, wherein the reconstructed policy is based on a vehicle state and a latent reward function.

3. The method of claim 1, wherein the expert policy is based on the vehicle having N trajectories.

4. The method of claim 2, wherein the reconstructed policy is used to recover the expert policy and the latent reward function.

5. The method of claim 1, wherein the vehicle sensor data includes distances and relative speeds from neighboring vehicles in left, right and same lanes.

6. The method of claim 1, wherein the vehicle action includes three modes of vehicle speed change including more speed, less speed, and no change.

7. The method of claim 1, wherein the vehicle action includes three modes of vehicle lateral position change including left lane change maneuver, same lane, and right lane change maneuver.

8. A system, comprising a processor; and a memory, programmed to:

training a deep neural network (DNN) using an inverse reinforcement learning (IRL) system that includes a variational auto-encoder (VAE) by generating a reconstructed policy at least in part by applying a cumulative reward function, and then using an adversarial discriminator network to discriminate the reconstructed policy and an expert policy at least in part by distinguishing expert actions from reconstructed actions by calculating discriminator loss and thereby determine the cumulative reward function based on incomplete or missing cumulative reward information;

determining a vehicle action based on vehicle sensor data input to the DNN; and operating the vehicle based on the vehicle action.

9. The system of claim 8, wherein the reconstructed policy is based on a vehicle state and a latent reward function.

10. The system of claim 8, wherein the expert policy is based on the vehicle having N trajectories.

11. The system of claim 9, wherein the reconstructed policy is used to recover the expert policy and the latent reward function.

12. The system of claim 8, wherein the vehicle sensor data includes distances and relative speeds from neighboring vehicles in left, right and same lanes.

13. The system of claim 8, wherein the vehicle action includes three modes of vehicle speed change including more speed, less speed, and no change.

14. The system of claim 8, wherein the vehicle action includes three modes of vehicle lateral position change including left lane change maneuver, same lane, and right lane change maneuver.

15. The system of claim 8, further comprising generating the reconstructed policy by summing a product of the log of a reconstructed policy times a reward function added to a discriminator function of a reconstructed action over a plurality of samples.

16. The system of claim 8, wherein the reconstructed policy and the expert policy are discriminated based on likelihood loss determined by summing over a plurality of samples a cross-entropy error function and discriminator loss over a plurality of samples.

17. The system of claim 8, wherein a reward function is determined based on probability functions of previously acquired cumulative reward functions and expert states and expert actions output by an encoder.

18. The system of claim 8, wherein Probability distributions of cumulative reward functions can be determined by executing a plurality of simulations under a plurality of conditions of expert states.

19. A system, comprising:

means for controlling second vehicle steering, barking and powertrain;

computer means for:

training a deep neural network (DNN) using an inverse reinforcement learning (IRL) system that includes a variational auto-encoder (VAE) by generating a reconstructed policy at least in part by applying a cumulative reward function, and then using an adversarial discriminator network to discriminate the reconstructed policy and an expert policy at least in part by distinguishing expert actions from reconstructed actions by calculating discriminator loss and thereby determine the cumulative reward function based on incomplete or missing cumulative reward information;

determining a vehicle action based on vehicle sensor data input to the DNN; and operating the vehicle based on the vehicle action and the means for controlling second vehicle steering, braking and powertrain.

* * * * *